US008175865B2

(12) United States Patent
Kuo et al.

(10) Patent No.: US 8,175,865 B2
(45) Date of Patent: *May 8, 2012

(54) METHOD AND APPARATUS OF GENERATING TEXT SCRIPT FOR A CORPUS-BASED TEXT-TO SPEECH SYSTEM

(75) Inventors: Chih-Chung Kuo, Hsin-Chu (TW); Jing-Yi Huang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 1179 days.

This patent is subject to a terminal disclaimer.

(21) Appl. No.: 11/956,336

(22) Filed: Dec. 14, 2007

(65) Prior Publication Data

US 2008/0091431 A1 Apr. 17, 2008

Related U.S. Application Data

(63) Continuation-in-part of application No. 10/384,938, filed on Mar. 10, 2003.

(51) Int. Cl.
*G06F 17/27* (2006.01)

(52) U.S. Cl. ............................ 704/9; 704/266; 704/255

(58) Field of Classification Search .................. 704/260, 704/245, 251, 257, 1-10, 266, 255
See application file for complete search history.

(56) References Cited

U.S. PATENT DOCUMENTS 6,038,533 A * 3/2000 Buchsbaum et al. ......... 704/260

OTHER PUBLICATIONS

Van Santen et al. "Methods for Optimal Text Selection", Proc of Eurospeech97, pp. 553-556, 1997.*

* cited by examiner

*Primary Examiner* — Huyen X. Vo
(74) *Attorney, Agent, or Firm* — Lin & Associates IP, Inc.

(57) ABSTRACT

A method of text script generation for a corpus-based text-to-speech system includes searching in a source corpus having L sentences, selecting N sentences with a best integrated efficiency as N best cases, and setting iteration k to be 1; for each case n of the N best cases, selecting $M_{k+1}$ best sentences with the best integrated efficiency from the unselected sentences in the source corpus; keeping N best cases out of the total unselected sentences for next iteration, and increasing iteration k by 1; and if a termination criterion being reached, setting the best case in the N traced cases as the text script, otherwise, returning to the $(k+1)^{th}$ iteration of searching in the unselected sentences for $(k+1)^{th}$ sentence; wherein the best integrated efficiency depends on a function of combining the covering rate of the synthesis unit type, the hit rate of the synthesis unit type, and the text script size.

14 Claims, 10 Drawing Sheets

| | | | Phonetic | Prosodic | Priority |
|---|---|---|---|---|---|
| Self features | | | Syllable | Tone | Must |
| Context features | Neighbor | Left | LPhone | LTone | Should |
| | | Right | RPhone | RTone | |
| | Intra-Word | | | IWord | Should |
| | Intra-Sentence | | | ISent | May |

FIG. 1
( Prior Art )

| Unit class | UV | | CV | | | | CUV | | |
|---|---|---|---|---|---|---|---|---|---|
| | U0 | U1 | C1 | C2 | C3 | C4 | CU2 | CU3 | CU4 |
| Syllable | 413 | 413 | 1 | 1 | 1 | 1 | 413 | 413 | 413 |
| Tone | 1 | 5 | 1 | 1 | 1 | 1 | 5 | 5 | 5 |
| LPhone | 1 | 1 | 10 | 11 | 14 | 17 | 11 | 14 | 17 |
| RPhone | 1 | 1 | 22 | 26 | 29 | 38 | 26 | 29 | 38 |
| LTone | 1 | 1 | 2 | 2 | 5 | 6 | 2 | 5 | 6 |
| RTone | 1 | 1 | 2 | 2 | 5 | 6 | 2 | 5 | 6 |
| IWord | 1 | 1 | 2 | 4 | 4 | 9 | 4 | 4 | 9 |
| ISent | 1 | 1 | 1 | 4 | 4 | 4 | 4 | 4 | 4 |
| Space size | 413 | 2065 | 1.8K | 18K | 162K | 837K | 38M | 335M | 1.7G |

FIG. 2
( Prior Art )

| Stage | Unit | $w$ | Termination criteria | | |
|---|---|---|---|---|---|
| | | | Instance size | Covering rate | Hit rate |
| 1 | U1 | 0 | 10 per type | 100% | 100% |
| 2 | CU2 | 0.25 | Unlimited | > 10% | > 50% |
| 3 | CU3 | 1 | > 150 K | Unlimited | Unlimited |

FIG. 7

| | CU2 | | CU3 | | CU4 | |
|---|---|---|---|---|---|---|
| | MSRC | ITRI($w$=1) | MSRC | ITRI($w$=1) | MSRC | ITRI($w$=1) |
| $\lvert Xs \rvert$ | 57472 | 59218 | 131833 | 83596 | 153535 | 95458 |

FIG. 8

METHOD AND APPARATUS OF GENERATING TEXT SCRIPT FOR A CORPUS-BASED TEXT-TO SPEECH SYSTEM

CROSS REFERENCE

This is a continuation-in-part application for the application Ser. No. 10/384,938 filed on Mar. 10, 2003.

FIELD OF THE INVENTION

The present invention generally relates to a method for text script generation, and more specifically to a method and apparatus of text script generation for a corpus-based text-to speech (TTS) system.

BACKGROUND OF THE INVENTION

The synthesis unit based on a large corpus has become a possible way to generate general-purpose speech sounds in TTS systems. Corpus-based TTS has become the major trend because the resulted speech sounds are more natural than that produced by parameter-driven production models. The key issues for this approach may include a well-designed and recorded corpus, manual or automatic labeling of segmental and prosodic information, selection or decision of synthesis unit types, and selection of the speech segments for each unit type.

Features for defining unit types may include context-independent features or context-dependent features, or both. FIG. 1 shows exemplary features for defining unit types. In the FIG. 1, for example, context-independent features may include the phonetic syllable and the prosodic tone. Context-dependent features may include the phonetic left/right phone and the prosodic left/right tone.

Any one unit type may be specified by a feature vector consisting of various dimensions of features. The feature vector with the features of the unit itself is called Unit Vector (UV). On the other hand, the Context Vector (CV) consists of text information of a unit. Therefore, context-dependent unit may be specified by Contextual Unit Vector (CUV), which is concatenated by UV and CV. FIG. 2 illustrates the size of the feature vector space depends on the resolution of each feature dimension based on FIG. 1. In the FIG. 2, three exemplary unit classes, CU2, CU3, and CU4 are used.

A typical method used to build a synthesizer is directly recording 413 syllable types in a single-syllable manner. This may make the segmentation easier, avoid co-articulation problem, and usually may have a more stationary waveform and steady prosody. However, it is not only found that the synthetic speech produced by the speech segments extracted from single syllable recording sounds unnatural, but also believed that this kind of speech segments is not suitable for multiple segment units selection. This is because neither natural prosody nor contextual information could be utilized in a single syllable recording system. Therefore, how to select a well-designed text script for speech recording may be one of the key factors for TTS systems.

There are generally two approaches to the text script generation. One is to emphasize the diversity of unit types in the inventory. The other is to pursue the probability for the unit type of an input case to be found in the inventory. The first approach tries to select the text containing richness of phonetic and prosodic features. The text script is usually selected from more than one corpus to search for various kinds of contextual combinations. Even sentences designed purposely by linguists are also used. Fully automatic methods, for example, greedy algorithm are broadly used in some applications, too. This approach may produce a text script with large size that will cost a lot both for building a TTS system and for the storage requirement of the system.

The second approach represents the recent trend to use a very large corpus. The weighted greedy algorithm is used to select a subset corpus from a large raw text corpus. The weights could be applied in two ways: occurring frequencies of unit types or reciprocal of frequencies of unit types. There is a list of necessary unit vectors built first by sorting the occurring rate of each unit vector and leaving high-occurring-rate ones that have accumulated frequency larger than a specified number in the list. With the weighted greedy algorithm, the sentence with highest sum of weights will be selected first, and then occurred units would be deleted in the list of necessary unit vectors. The occurring rates of the unit types in the large corpus are taken into account in text script generation so as to maximize the probability to hit the same unit type in synthesis. Since there is a risk of missing some core unit types, an approach is to fill up enough number of each core unit types in the list. The problem is some kind of fixed, but the algorithm may not be precisely controllable and flexibly scalable. One cannot decide when to stop the procedure except end of the experiment and passively accept the resulted hit rate, covering rate, and text script size.

In other words, one approach to the text script generation for a corpus-based TTS system may emphasize the diversity of unit types in the inventory, i.e. covering rate of unit types. The other approach may pursue the probability for the unit type of an input case to be found in the inventory, i.e. hit rate of unit instances.

SUMMARY OF THE INVENTION

In one exemplary embodiment, the present disclosure is directed to a method of text script generation for a corpus-based TTS system, comprising: (a) searching in a source corpus having L sentences, selecting N sentences with a best integrated efficiency as N best cases, L and N being natural numbers, and setting iteration k to be 1; (b) for each case n of the N best cases, $1 \leqq n \leqq N$, selecting $M_{k+1}$ best sentences with the best integrated efficiency from the unselected sentences in the source corpus, $1 \leqq M_{k+1} \leqq L$; (c) keeping N best cases out of the total unselected sentences for next iteration, and increasing iteration k by 1; and (d) if a termination criterion being reached, setting the best case in the N traced cases as the text script, otherwise, returning to step (b); wherein the best integrated efficiency depends on a function combining the covering rate of synthesis unit types, the hit rate of the synthesis unit types, and the text script size.

In another exemplary embodiment, the present disclosure is directed to a text script generator for a corpus-based TTS system, comprising: a search criteria selector for searching in a source corpus and selecting N sentences with a best integrated efficiency as N best cases; a performance index constructor for providing covering rate and hit rate corresponding to all unit types in a source corpus, and a termination criteria detector for generating a best case in the N traced cases as the text script upon detecting a termination criterion is reached; wherein the best integrated efficiency depends on a function combining the covering rate efficiency, the hit rate efficiency, and the text script size.

Exemplary search criteria may include covering-rate efficiency, hit-rate efficiency, and integrated efficiency. The exemplary termination criteria may be a combination of threshold for text script size, covering rate, hit rate, and integrated rate.

Exemplary searched methods may be further characterized by the scalable and controllable design of the multi-stage search, such as 2-stage search or 3-stage search. Through the design of the multi-stage search, the present disclosure may provide various kinds of text scripts ideally suitable for the requirements of various corpus-based TTS systems.

The foregoing and other features, aspects and advantages of the present disclosure will become better understood from a careful reading of a detailed description provided herein below with appropriate reference to the accompanying drawings.

BRIEF DESCRIPTION OF THE DRAWINGS

FIG. 1 shows exemplary features for defining unit types.

FIG. 2 illustrates the size of the feature vector space depends on the resolution of each feature dimension based on FIG. 1.

FIG. 7 show exemplary performance results of the 3-stage search, consistent with certain disclosed embodiments.

FIG. 8, show an exemplary comparison of text script size with a fixed hit rate, between the present disclosure and the search method described by the modified weighted greedy algorithm.

DETAILED DESCRIPTION OF THE PREFERRED EMBODIMENTS

Figure 3:
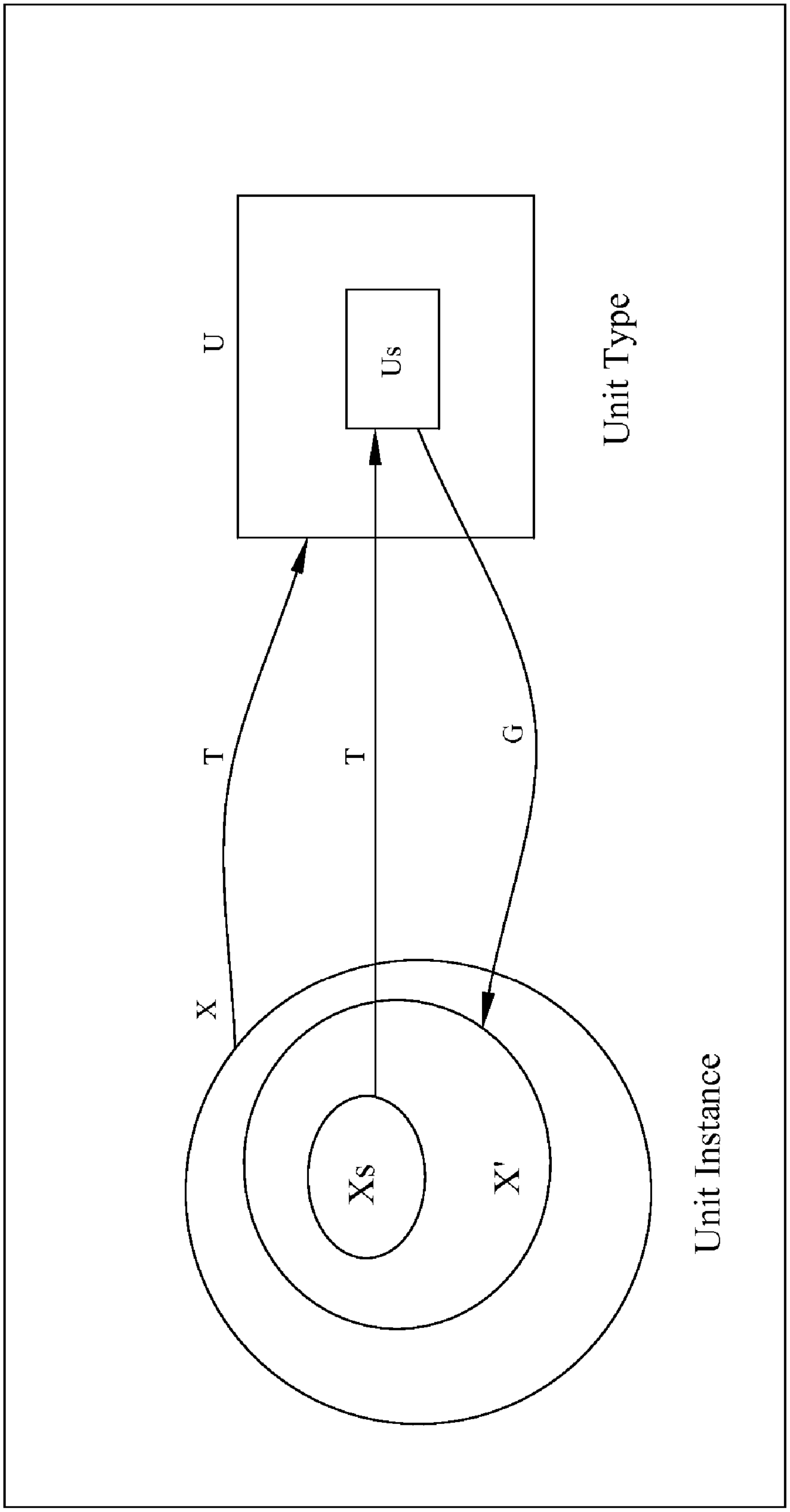
FIG. 3 defines an exemplary text script generation problem, consistent with certain disclosed embodiments.

FIG. 3 defines an exemplary text script generation problem, consistent with certain disclosed embodiments. Referring to the FIG. 3, there is a mapping from a unit instance domain to a unit domain. The text script generation problem may be defined formally as follows.

First, define the unit type function as follows:

$$u=t(x) \tag{1}$$

where u is the unit type to which the unit instance x belongs.

Define two mapping functions of sets as follows, i.e. the unit-type covering function U and the unit-instance gathering function X':

$$U=T(X)=\{u=t(x)|\forall x\in X\} \tag{2}$$

$$X'=G(X,U)=\{x'|\forall x'\in X \text{ and } t(x')\in U\} \tag{3}$$

where X is a set of unit instances and U is a set of unit types. Obviously, G(X,T(X))=X, or more generally, $\forall X_S \subseteq X$, $G(X,T(X_S))=X' \Rightarrow X_S \subseteq X' \subseteq X$.

The problem to find the text script may be clearly visualized in FIG. 1, where the sets are defined as follows:

X: the set of all unit instances in the corpus.

$X_S$: the set of all unit instances in the selected text script.

U: the set of unit types covered by X, i.e., U=T(X).

$U_S$: the set of unit types covered by $X_S$, i.e., $U_S=T(X_S)$

X': the set of all unit instances gathered by $U_S$, i.e. $X'=G(X, U_S)=G(X,T(X_S))$.

It's clear that $X_S \subseteq X' \subseteq X$ and $U_S \subseteq U$.

Based on the above definition, the present disclosure may present performance indices and search criteria for the text script generation in the design of a corpus-based TTS system. The performance indices may include the covering rate (CR) of unit types, the hit rate of unit types, and the text script size. If an efficient text script is selected from a source corpus, it indicates that the selected text script may at least have the features of high covering rate, high hit rate and small script size. In other words, the selected text script may have a small script size since not only the processing cost of speech corpus could be less, but also the memory requirement of the TTS system could be lower. It may contain as many unit types as possible, so any input case may find its corresponding unit types in the inventory. It may also contain as many as unit instances, so that the probability of an input case to be found in the inventory will be the highest.

The unit-type covering rate may be defined as follows:

$$r_C = \frac{|U_S|}{|U|} = \frac{|T(X_S)|}{|T(X)|} \le 1. \tag{4}$$

The notation $|U_S|$ represents the size of the set U, i.e., the number of the elements in the set U. The occurring rate of each unit type may be quite different. Thus, it may be better to take the total instances gathered by the $U_S$ into consideration. Thus, the unit-type Hit Rate (HR) may be used as another performance index. The unit-type Hit Rate (HR) may be defined as follows.

$$r_H = \frac{|X'|}{|X|} = \frac{|G(X, T(X_S))|}{|X|} \le 1. \tag{5}$$

As mentioned above, an efficient text script selected may at least have the features of high covering rate, high hit rate and small script size. High covering rate or high hit rate may be achieved, for example, by maximizing the CR or the HR. On the other hand, the small script size may be achieved, for example, by minimizing the size of the text script, i.e. $|X_S|$. To combine the two contradictive achievements together, the present disclosure may define the following exemplary criteria for the selection of the text script.

Covering – rate Efficiency:

$$\eta_C = \frac{r_C}{|X_S|} = \frac{|U_S|}{|U||X_S|}, \tag{6}$$

Hit – rate Efficiency:

$$\eta_H = \frac{r_H}{|X_S|} = \frac{|X'|}{|X||X_S|}, \tag{7}$$

Integrated Efficiency:

$$\eta_I = \alpha\cdot\eta_H + (1-\alpha)\cdot\eta_C = \frac{1}{|X|}\left(\frac{\alpha\cdot|X'| + (1-\alpha)\cdot\mu\cdot|U_S|}{|X_S|}\right), \tag{8}$$

where $$\mu = \frac{|X|}{|U|} \geq 1$$

is the average number of instances per unit type, and α is the weighting factor with the value 0≦α≦1. It's clear that the formula in Equations (6) and (7) are the special cases of that in Equation (8) when α=0 and α=1, respectively.

Although the corpus is represented as a set of unit instances above, a practical corpus is made up of sentences of text. The minimal unit for recording is a sentence. This means that the text script is a list of sentences that were selected from the corpus one by one. Therefore the generation of the text script is actually a search problem that tries to select the best possible list of sentences from the corpus.

In an exemplary embodiment, the present disclosure may provide a new search method to generate the text script more systematically and efficient based on some search criteria and some termination criteria. For example, the search criteria may involve the covering-rate efficiency in Equation (6), the hit-rate in Equation (7), and the integrated efficient in Equation (8). The termination criteria, for example, may involve a threshold for script size, covering rate, hit rate, and integrated rate, for the text script generation in the design of corpus-based Text-to-Speech systems.

Figure 4:
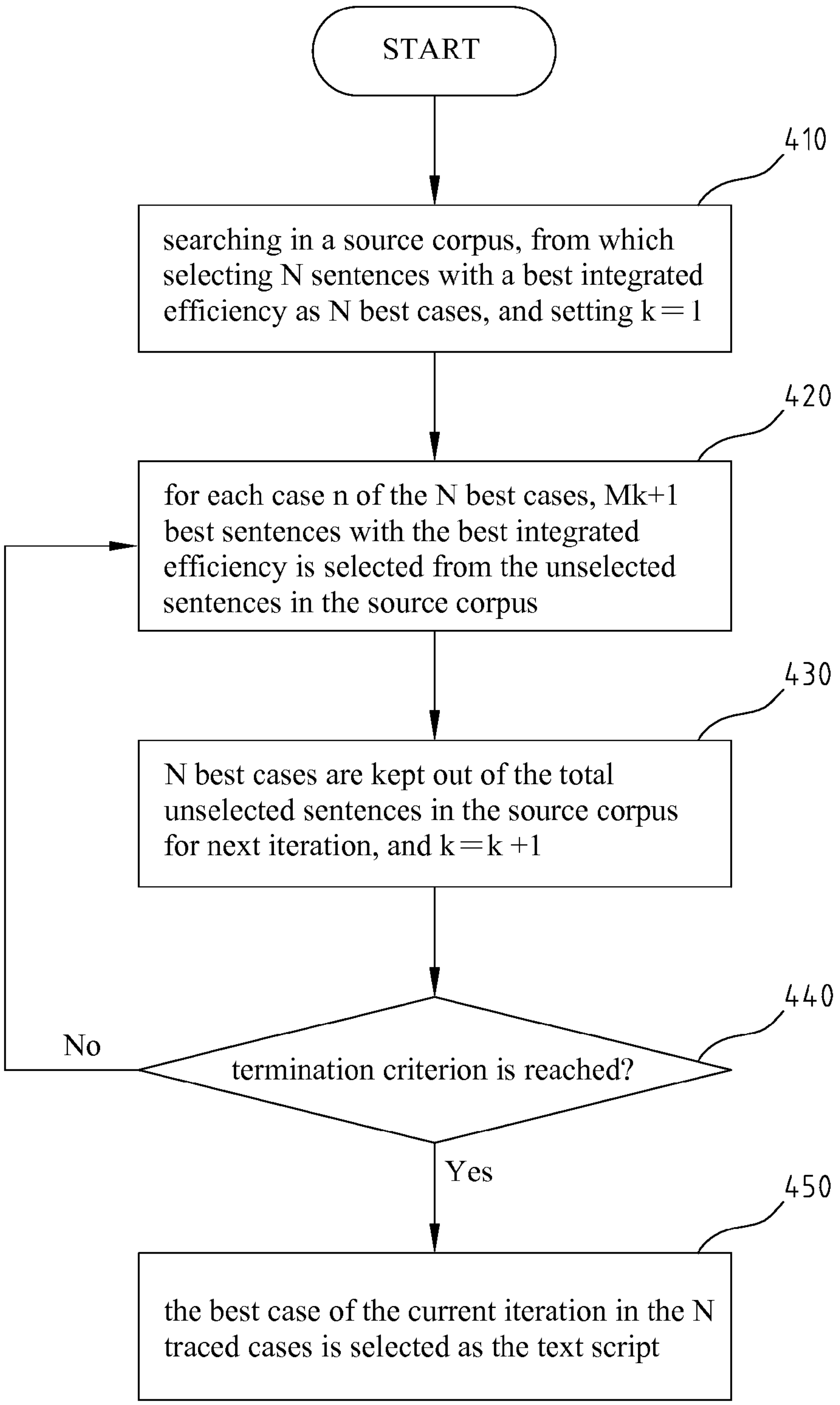
FIG. 4 illustrates an exemplary flow chart of an exemplary method of generating text script for a corpus-based TTS system, consistent with certain disclosed embodiments.

FIG. 4 illustrates an exemplary flow chart of the invention, consistent with certain disclosed embodiments. Referring to the exemplary flow chart in FIG. 4, step 410 is searching in a source corpus, from which selecting N sentences with a best integrated efficiency as N best cases, and setting iteration number k to be 1. Wherein the source corpus includes L sentences, L and N are natural numbers, and N≦L. In the step 420, for each case n of the N best cases, $M_{k+1}$ best sentences with the best integrated efficiency is selected from the unselected sentences in the source corpus, wherein 1≦n≦N, 1≦$M_{k+1}$≦L. In the step 430, N best cases are kept out of the total unselected sentences in the source corpus for next iteration. The iteration number k is increased by one. A termination criterion will be checked, as shown in step 440. If the termination criterion is reached, the best case of the current iteration in the N traced cases is selected as the text script, as shown in step 450; otherwise, returns to step 420. The best integrated efficiency may depend on a function combining the covering rate of synthesis unit types, the hit rate of the synthesis unit types, and the text script size.

In the exemplary flow chart, the logical search criterion, for example, may be the efficiency index of Equation (8). For each un-selected sentence in the source corpus, the temporary "accumulated efficiency" can be computed with the formula in Equation (8). However, the better guess to achieve the global optimum is to select the sentence with the best efficiency except for the unit types already being selected before this search. That is, if the $X_S$ is the set of unit instances of the sentence and the $U_S$ is the set of unit types contained in the sentence except for those already being covered, the formula in Equation (8) could be used as the selection criterion.

One of the features of the present disclosure is that it may achieve better covering-rate and better hit-rate under less text script. The less text script, the better covering-rate, and the better hit-rate are repulsive. Hence, a best condition that simultaneously satisfies less text script, the better covering-rate and the better hit-rate may be estimated with Equations (6) and (7). On the basis of the following feature: a reciprocal of less text script is bigger, numbers of better covering-rate and better hit-rate are bigger, any equations of covering-rate efficiency and hit-rate efficiency confirming with the feature of the present disclosure may be used as the selection criteria of the present disclosure.

The selection loop may be terminated based on many criteria, such as a combination of threshold for text script size, covering rate, hit rate, and integrated rate. The exemplary termination criteria for terminating selection loop are described as below. $|X_S|$: Instance size. The search may stop when the selected text script has achieved a predefined size. For core unit search, the $|X_S|$ may represent the number of selected instances per unit type. Some floor value of instance size for each unit type may be defined to assure a minimal number of instances being selected for each core unit.

$r_H$: hit rate. This is useful because the hit rate of the resulting TTS inventory can be controlled.

$r_C$: covering rate of unit types.

$r_I = \alpha \cdot r_H + (1-\alpha) \cdot \mu_X \cdot r_c$; integrated index of hit-rate and covering-rate.

The criteria above may be used in any combinations according to practical consideration. For example, stop searching if $|X_S|$>threshold1 or ($r_H$>threshold2 and $r_C$>threshold3). Different criteria may also be used in different stages of multi-stage search described below.

The definition of unit types may range dramatically from a few context-independent units to huge amount of contextual units. Different requirements for each kind of unit type class must be considered. Therefore, a multi-stage search method is designed to generate a more balanced text script. Usually, the fewer core unit types require better type covering and should be selected first. This is because the cost for a core unit missing is higher. For robust consideration, the core unit types should be covered as many as possible. On the other hand, the larger amount of variant unit types expect better hit rate to achieve higher average performance and usually be searched in a latter stage.

The whole search algorithm may be very general and flexible. Many different unit type classes may be used in any stage. Therefore, the dimension and resolution of the unit class may be scalable. Many criteria may be used to control the generated text script to meet any pre-defined specification. This implies that the performance and cost may be scalable and precisely controllable.

In the present disclosure, the exemplary method described in the above to generate text script for a corpus-based TTS system has been conducted. The source corpus in experiments contains two parts. A smaller part is a phonetically balanced corpus consisting of manually collected or designed sentences that cover all 413 Mandarin syllables. A much larger part of the corpus contains sentences extracted from various materials in real life, including articles, newspaper, textbooks, dialog, interview, etc. The size of the final corpus, |X|, is 6,621,809 syllable instances, which is distributed in 617,734 sentences.

Mandarin Chinese TTS is the exemplary target system of this disclosure. The 413 Mandarin syllables are chosen as the basic synthesis unit because a Chinese character is a monosyllable. Starting from the basic unit, different degrees of expansion of the unit types may be defined based on various phonetic and prosodic features about the unit. The pronunciation of each Chinese character is specified by both a syllable and a tone. The intra-word and intra-sentence features are mainly about the syllable position inside a word and the word position inside a sentence. The words could be lexical words or even better prosodic words. Features for defining unit types shown in FIG. 1 and unit classes CU2, CU3, and CU4 shown in FIG. 2 are used in the experiments. The practical number of unit types contained in the source corpus for these three unit classes are 912,415, 1,418,914, and 1,673,051, respectively.

For a 2-stage search with different unit classes, the simplest multi-stage search may search for U1 unit in the first stage and the unit classes CU2 up to CU4 in the second stage. The U1 represents the core unit types, which are context-independent and are essential for the completeness of the synthesizer. The unit classes CU2 up to CU4 expand the unit types into context-dependent units, which are expected to cover various phonetic and prosodic contexts so as to improve the synthetic speech quality.

Figure 5A:
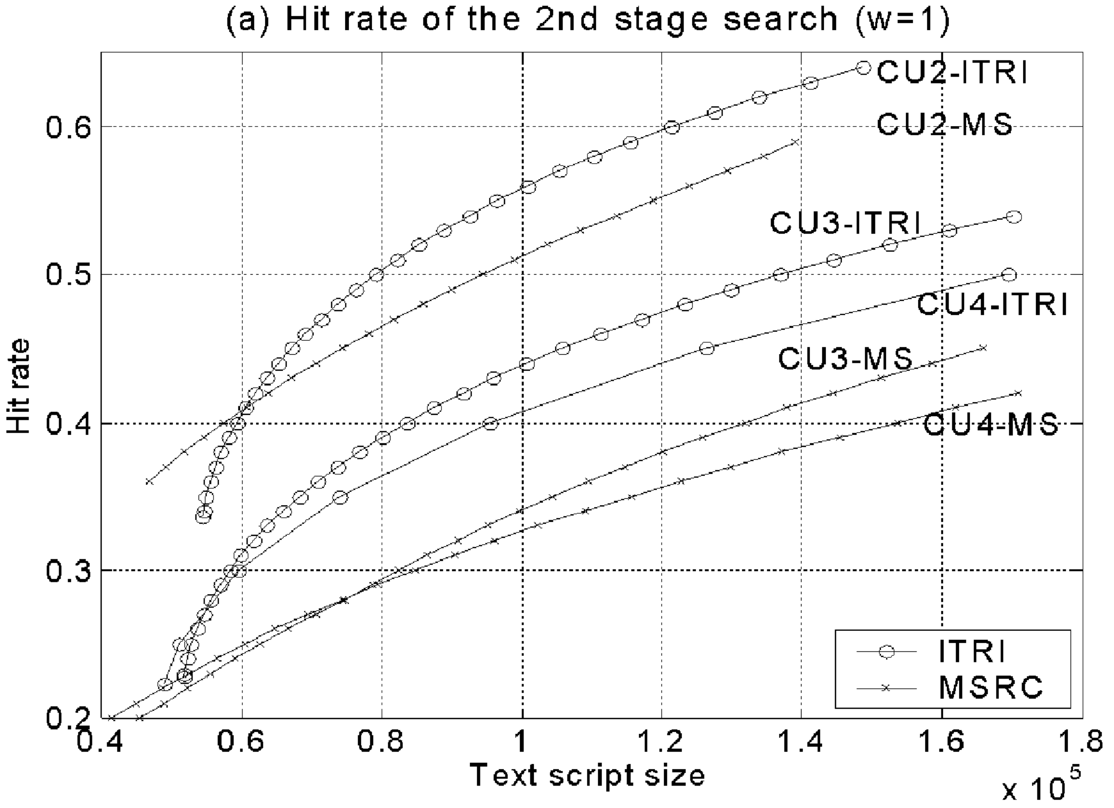
FIG. 5*a* and FIG. 5*b* show exemplary performance results of the 2-stage search with different unit classes, consistent with certain disclosed embodiments.
Figure 5B:
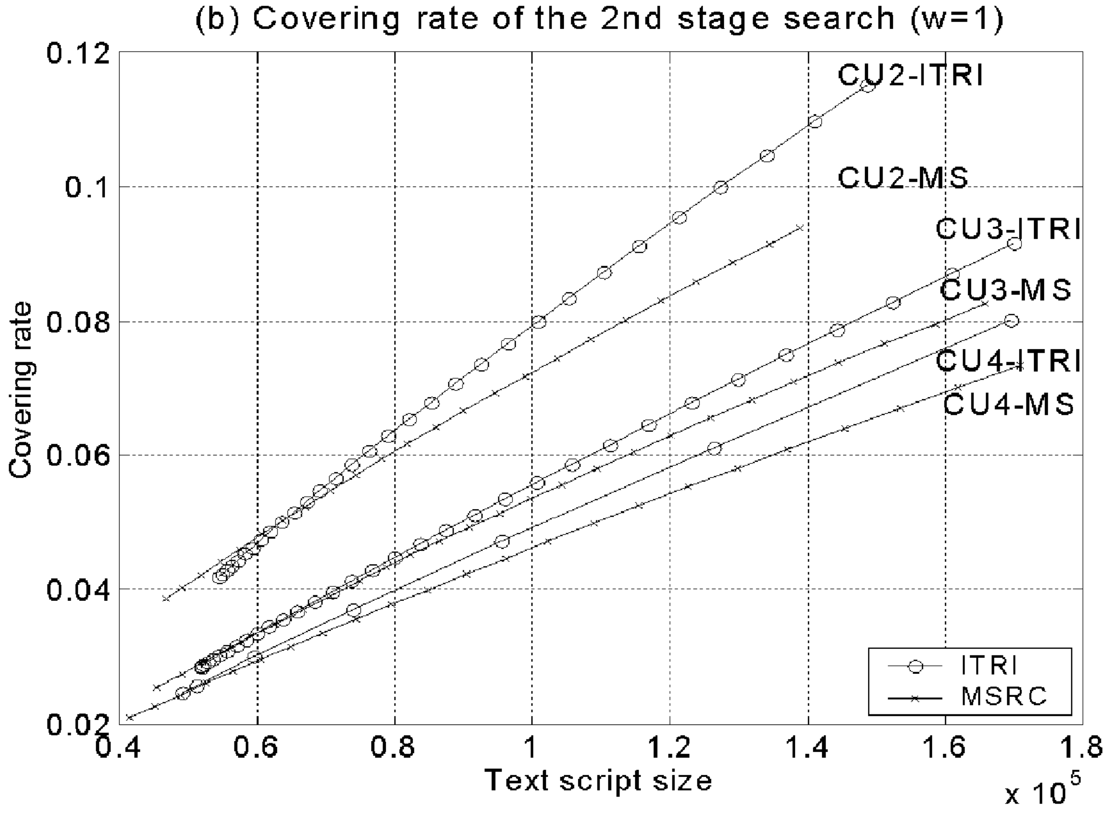

In the first stage, the weight w is 0 for emphasizing the covering rate and the termination criterion is to select a minimal number of instances for each unit type. In the second stage, the weight w is 1 to pursue the maximal hit rate. Exemplary performance results are given in FIG. 5*a* and FIG. 5*b*, consistent with certain disclosed embodiments. The search method described by the modified weighted greedy algorithm is also implemented and tested for comparison. It's clear that results performed by the present disclosure (denoted as ITRI) outperform the prior art (denoted as MS) in hit rate and even in covering rate with the same text script size. The exemplary results also show that the hit rate and covering rate descend with the space size of the unit class.

Figure 6A:
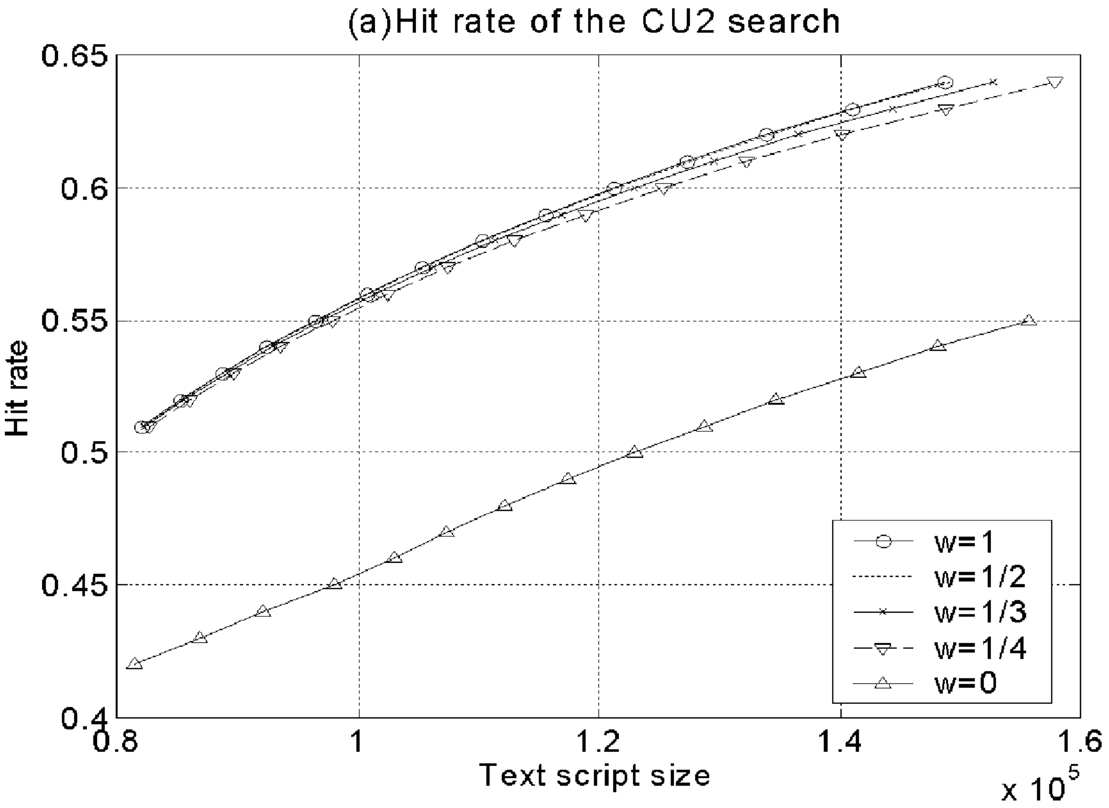
FIG. 6*a* and FIG. 6*b* show exemplary performance results of 2-stage search with different weighting factors, consistent with certain disclosed embodiments.
Figure 6B:
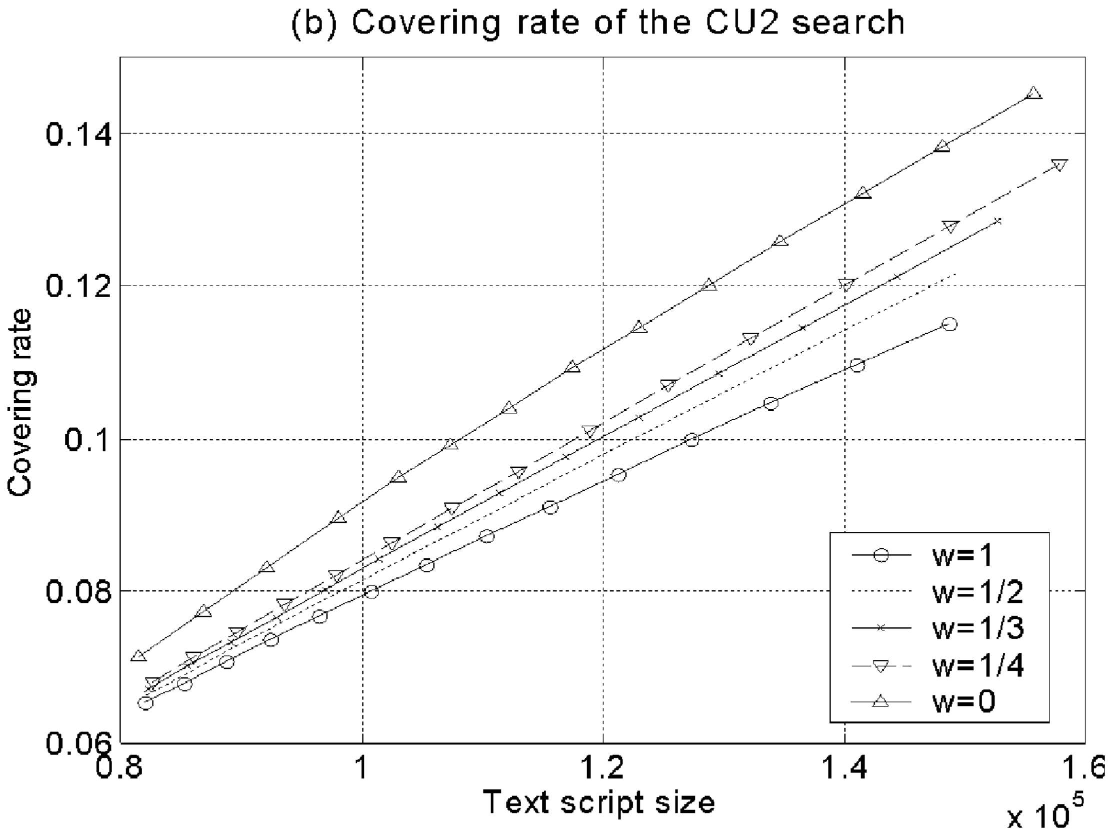

FIG. 6*a* and FIG. 6*b* give the results of 2-stage search with different weighting factors, consistent with certain disclosed embodiments. For example, the weighting factor w of 5 values in the CU2 stage. It's clear from FIG. 6*b* that the covering rate according to the present disclosure can be increased when w approaching 0. It can be seen from FIG. 6*a* that the hit rate decreases only slightly except for w=0.

A 3-stage search method is taken as an example. Through this kind of design, the present disclosure may obtain the text script that contains unit types of various degrees of significance with specified hit rate or covering rate, as shown in FIG. 7.

If the hit-rate is fixed to 40% as a termination criterion, the comparison of text script size between the present disclosure and the search method described by the modified weighted greedy algorithm are given in FIG. 8. In the exemplary comparison, search results are based on CU2, CU3, and CU4. As shown, the present disclosure may obtain a text script with a smaller size than that of using the modified weighted greedy algorithm.

Figure 9:
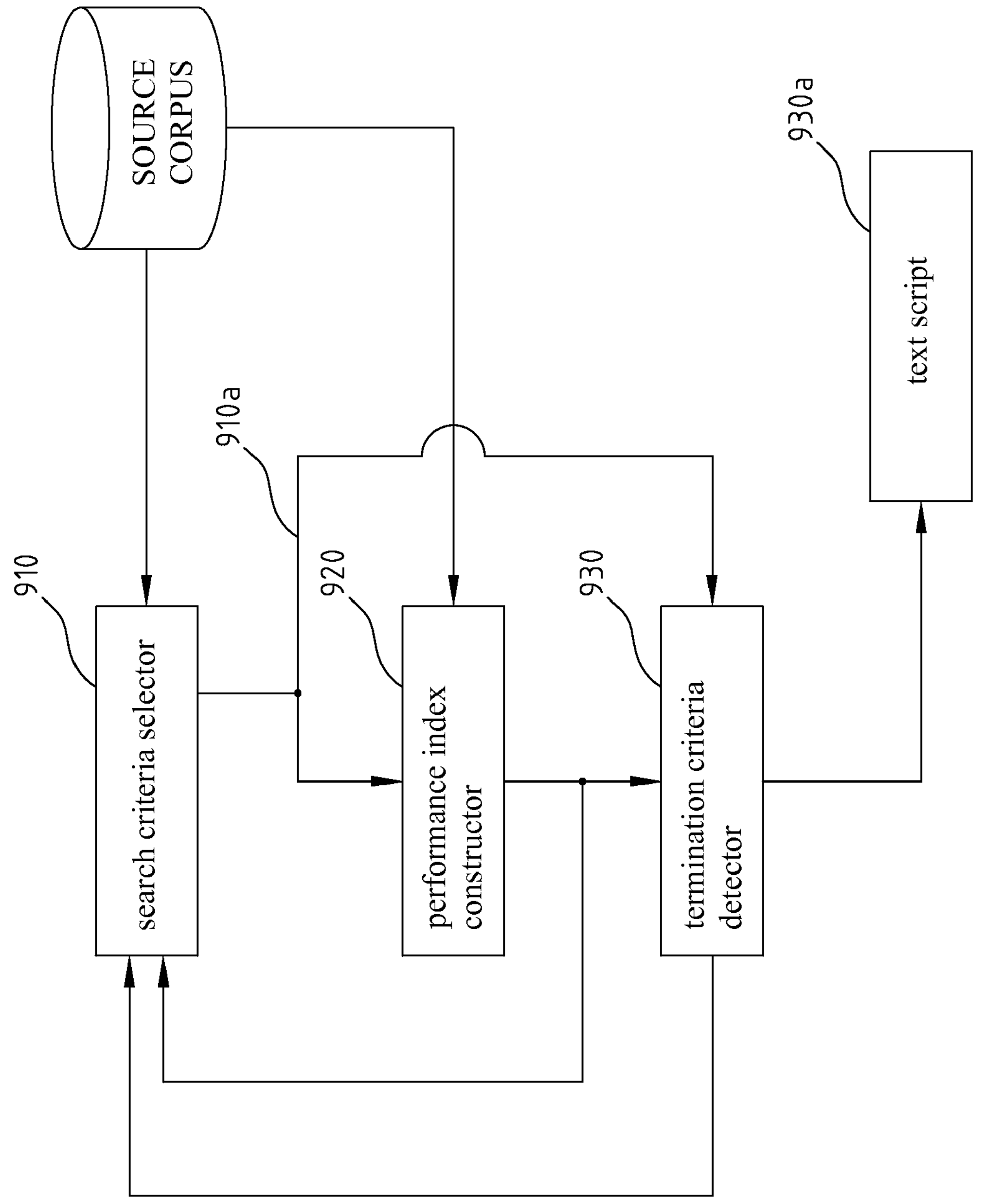
FIG. 9 shows an exemplary text script generator for a corpus-based TTS system, consistent with certain disclosed embodiments.

In another exemplary embodiment, the present disclosure may provide a text script generator for a corpus-based TTS system more systematically and efficiently based on the search criteria and termination criteria described above. FIG. 9 shows an exemplary text script generator for a corpus-based TTS system, consistent with certain disclosed embodiments. Referring to FIG. 9, the text script generator may include at least a search criteria selector 910, a performance index constructor 920, and a termination criteria detector 930. The search criteria selector 910 searches in a source corpus and selects N sentences with a best integrated efficiency as N best cases 910*a*. The performance index constructor 920 couples to the search criteria selector 910, and provides covering rate and hit rate corresponding to all unit types in the source corpus. The termination criteria detector 930 couples to the search criteria selector 910, and generates a best case in the N traced cases as the text script 930*a* upon detecting a termination criterion is reached. As mentioned above, the best integrated efficiency depends on a function combining the covering rate efficiency, the hit rate efficiency, and the text script size.

In summary, the present disclosure may provide a new search method. To generate text script for a corpus-based TTS system more systematically and efficiently based on a function of combining three search criteria and termination criteria. The exemplary search criteria may include covering-rate efficiency, hit-rate efficiency, and integrated efficiency. The exemplary termination criteria may be a combination of at least one of threshold for text script size, covering rate, hit rate, and integrated rate. By controlling a weighting factor, the covering rate and the hit rate may be increased, and increase the robustness of the TTS system. Scalable and controllable design of multi-stage search may produce various kinds of text scripts ideally suitable for the requirements of various corpus-based TTS systems.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method of text script generation for a corpus-based text-to-speech system configured with a computing device for text script searching and processing and a memory device for corpus storage, comprising:

(a) searching in a source corpus being stored in said memory device and having L sentences, selecting N sentences with a best integrated efficiency as N best cases, and setting iteration k to be 1, k, L and N being natural numbers, $N \leqq L$;

(b) for each case n of the N best cases, $1 \leqq n \leqq N$, searching in said source corpus and selecting by the computing device, $M_{k+1}$ best sentences with the best integrated efficiency from the unselected sentences in said source corpus, $1 \leqq M_{k+1} \leqq L$;

(c) searching in said source corpus and keeping N best cases out of the total unselected sentences for next iteration, and increasing iteration k by 1; and (d) if a termination criterion being reached, setting the best case in the N traced cases as the text script, otherwise, returning to step (b);

wherein said best integrated efficiency depends on a function of combining the covering rate efficiency of unit types, the hit rate efficiency of unit types, and the text script size.

2. The method of text script generation for a corpus-based text-to-speech system according to claim 1, wherein said searching from said step (a) up to said step (c) is further characterized by a method of scalable multi-stage search.

3. The method of text script generation for a corpus-based text-to-speech system according to claim 2, wherein said multi-stage search method allows the fewer core unit types are selected first, and the larger amount of variant unit types are searched in a latter stage.

4. The method of text script generation for a corpus-based text-to-speech system according to claim 1, wherein said termination criterion is a function of at least one of threshold for text script size, covering rate of unit types, hit rate of unit types, and integrated rate.

5. The method of text script generation for a corpus-based text-to-speech system according to claim 1, wherein said best integrated efficiency is an integrated efficiency of the form $$\eta_I = \alpha \cdot \eta_H + (1-\alpha) \cdot \eta_C,$$

$\alpha$ is a weighting factor, $0 \leqq \alpha \leqq 1$, $\eta_H$ is the hit rate efficiency of unit types, $\eta_C$ is the covering rate efficiency of unit types.

6. The method of text script generation for a corpus-based text-to-speech system according to claim 1, wherein said covering rate efficiency of unit types is of the form $$\eta_C = \frac{|U_S|}{|U||X_S|},$$

U is the set of unit types covered by the set of all unit instances in said source corpus, $X_S$ is the set of all unit instances in the selected text script, and $U_S$: is the set of unit types covered by $X_S$.

7. The method of text script generation for a corpus-based text-to-speech system according to claim 1, wherein said hit rate efficiency of unit types is of the form $$\eta_H = \frac{|X'|}{|X||X_S|},$$

X is the set of all unit instances in said source corpus, $X_S$ is the set of all unit instances in the selected text script, and X' is the set of all unit instances gathered by the set of unit types covered by $X_S$.

8. The method of text script generation for a corpus-based text-to-speech system according to claim 1, said method presents at least unit-type covering rate and unit-type hit rate as a first performance index and a second performance index respectively, for the text script generation in the corpus-based text-to-speech system.

9. The method of text script generation for a corpus-based text-to-speech system according to claim 8, wherein said unit-type covering rate is defined as $$r_C = \frac{|U_S|}{|U|},$$

U is the set of unit types covered by the set of all unit instances in said source corpus, and $U_S$: is the set of unit types covered by the set of all unit instances in the selected text script.

10. The method of text script generation for a corpus-based text-to-speech system according to claim 8, wherein said unit-type hit rate is defined as $$r_H = \frac{|X'|}{|X|},$$

X is the set of all unit instances in said source corpus, and X' is the set of all unit instances gathered by the set of unit types covered by the set of all unit instances in the selected text script.

11. A text script generator for a corpus-based text-to-speech system configured with a computing device for text script searching and processing and a memory device for corpus storage, comprising:

a search criteria selector constructed in said computing device for searching in a source corpus being stored in said memory device and having L sentences, and selecting N sentences with a best integrated efficiency as N best cases, L and N being natural numbers, $N \leqq L$;

a performance index constructor constructed in said computing device and coupled to said search criteria selector, for providing covering rate and hit rate corresponding to all unit types in said source corpus; and a termination criteria detector constructed in said computing device and coupled to said search criteria selector, for generating a best case in the N traced cases as a text script upon detecting a termination criterion is reached;

wherein said best integrated efficiency depends on a function of combining the covering rate efficiency of unit types, the hit rate efficiency of unit types, and the size of said text script.

12. The text script generator for a corpus-based text-to-speech system according to claim 11, wherein said best integrated efficiency is an integrated efficiency of the form $$\eta_I = \alpha \cdot \eta_H + (1-\alpha) \cdot \eta_C,$$

$\alpha$ is a weighting factor, $0\alpha \leqq 1$, $\eta_H$ is the hit rate efficiency of unit types, $\eta_C$ is the covering rate efficiency of unit types.

13. The text script generator for a corpus-based text-to-speech system according to claim 11, wherein said termination criterion is a function of at least one of threshold for text script size, covering rate of unit types, hit rate of unit types, and integrated rate.

14. The method of text script generation for a corpus-based text-to-speech system according to claim 11, wherein said search criteria selector is further characterized by a scalable and controllable design of multi-stage search.

* * * * *